March 7, 1950 G. GANO 2,499,911
LOCK-IN PRESSER PLATE AND FILM THREADING DOWEL MEANS
Filed Nov. 28, 1947 2 Sheets-Sheet 1
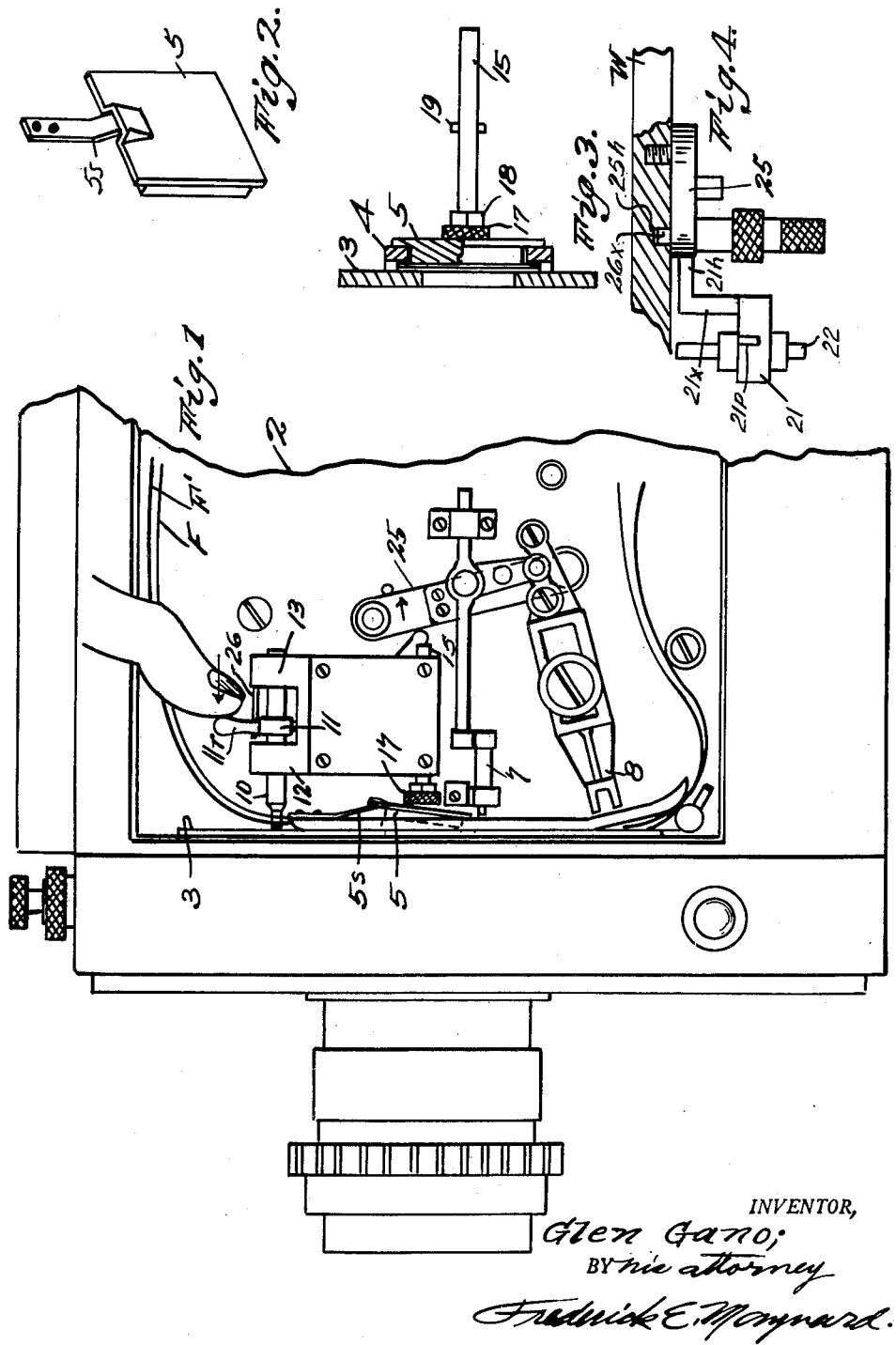
INVENTOR,
Glen Gano;
BY his attorney
Frederick E. Maynard.

March 7, 1950 — G. GANO — 2,499,911
LOCK-IN PRESSER PLATE AND FILM THREADING DOWEL MEANS
Filed Nov. 28, 1947 — 2 Sheets-Sheet 2
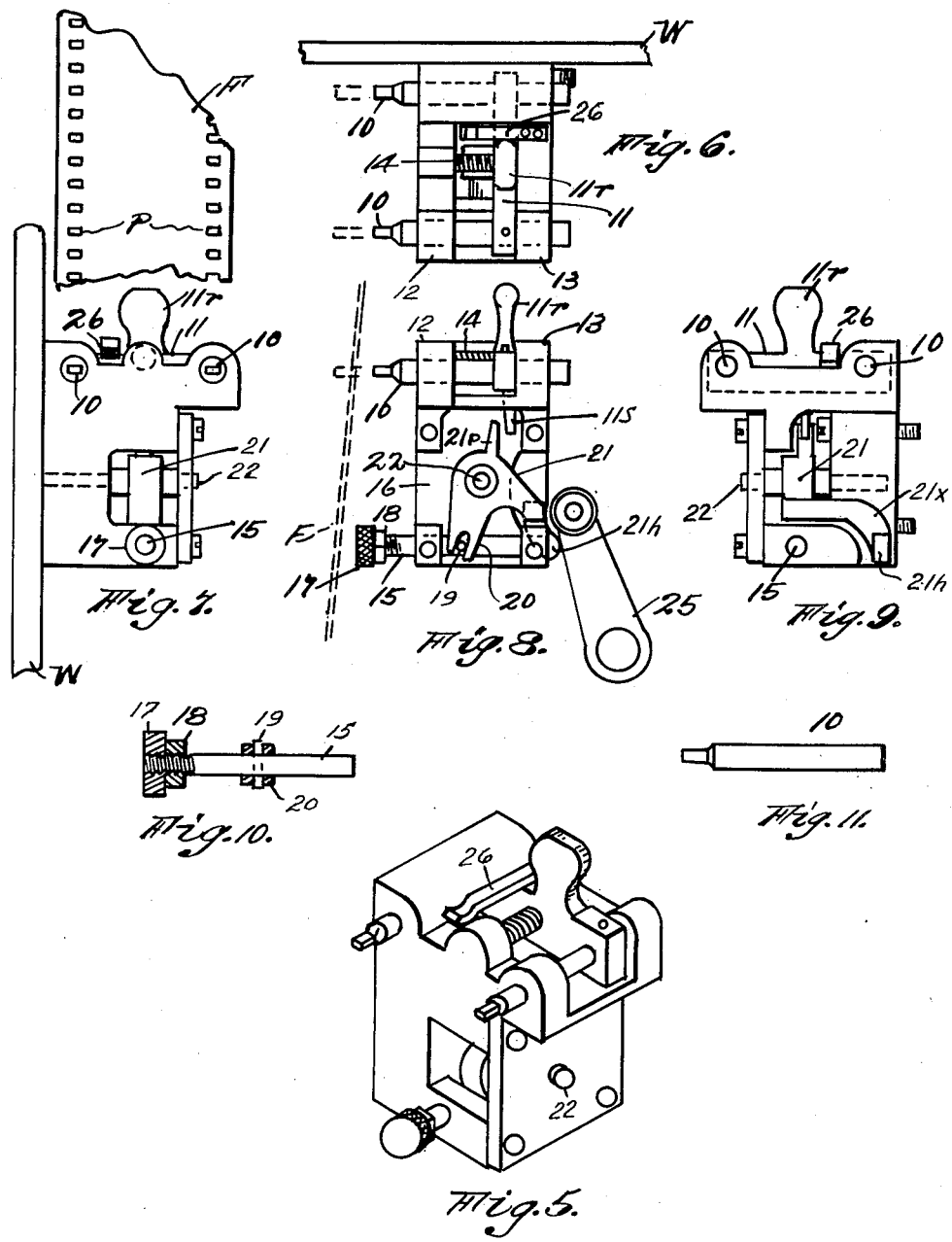
INVENTOR,
Glen Gano;
BY his attorney,
Frederick E. Maynard.

Patented Mar. 7, 1950

2,499,911

UNITED STATES PATENT OFFICE 2,499,911

LOCK-IN PRESSER PLATE AND FILM THREADING DOWEL MEANS

Glen Gano, North Hollywood, Calif.

Application November 28, 1947, Serial No. 788,339

12 Claims. (Cl. 88—17)

This invention is a means to greatly facilitate the threading of perforated, motion picture films into motion picture making cameras.

Conventional cameras of such type have a claw pin device for feeding the film through the camera and a register or pilot pin unit for holding the film stationary during exposure. While the claws are in a position withdrawn from the film track of the camera, at the aperture plate, the leading end of a film strip can be threaded from the top of the camera box if and when the pilot pin unit has been retracted from the track to clear the way for the entering film end. The pilot pin unit is retractable by a retracting lever provided for that purpose.

Owing to the very cramped space in the camera box it is a time-taking and tedious job to properly register perforations of the film with the retracted pilot pins because the film is practically concealed in the aperture plate track make-up at the position where the pilot pins are effective to engage the film; and it is especially difficult to register multi-pack films as to the pilot pins. There is always the hazard that the pins will punch through the interposed film stock with the result that the camera-man has to lose much time by taking down camera parts to look for dangerous chips.

It is an object of this invention to provide a simple, practical, substantial, reliable, efficient and low cost mechanism which is conspicuously visible in the opened camera box and has a visual instrument to which visible film, outside of the usual track make-up (the aperture plate and the relative guide plate) may be very quickly longitudinally shifted to bring a coordinate pair of its perforations into register with said instrument whereby to position a lower pair of perforations in accurate position for instant entry of the pilot pins, when lever released.

Particularly, an object of the invention is to provide for the easy and rapid registration of apertures of multiple, superimposed films to the pilot pins of the camera, and to this purpose a dowel device is mounted in a clearly visible position in the camera box in such a relation that when a film or a plurality of lapped films are threaded into the guide track and past the purposely withdrawn pilot pins, if and when an upper portion of a film or films is pushed by the camera-man onto the said dowel device registered with adjacent film perforations then there will be film perforations registered with the retracted pilot pins. As soon as the film has been impaled by the dowel device the pilot pins can be released for normal, instant entry into the pre-positioned film perforations thereat.

A further object of the invention is to further facilitate film threading into the camera by provision of a solidly lockable, vibration proof film presser plate, and means controlled by the said retracting lever for thusly locking the presser plate in its normal position at the aperture plate; the said presser plate, when unlocked being freely or floatably mounted in the guide plate of the track make-up.

Noticeably, a purpose of the invention to provide a means to visually pre-position the film in the guide track without in any way altering or changing the installed, film controlling means in the camera, but, instead actually employs a part of the regular mechanism to effectively lock the presser plate. Heretofore such presser plates have been removably retained in situ by a spring device which permitted objectionable vibrations of said plate.

The invention consists in certain advancements in this art as set forth in the ensuing disclosure and having, with the above, additional objects and advantages as hereinafter developed, and whose constructions, combinations and sub-combinations, and details of means and the manner of operation will be made manifest in the following description of the herewith illustrative embodiment; it being understood that modifications, variations and adaptations may be resorted to within the scope, spirit and principles of the invention as it is claimed in conclusion hereof.

Figure 1 is a side elevation of an opened portion of a motion picture camera; showing the pre-positioning dowel device in film registering position, and the pilot unit and the feeding claw being in withdrawn position, as to the film track make-up.

Figure 2 is a perspective of the isolated presser plate.

Figure 3 is a horizontal section of the aperture and guide plates, and the locked presser plate.

Figure 4 is a sectional plan of the pilot retracting lever, in position to lock the presser plate.

Figure 5 is a perspective of the isolated dowel device and plate bolting assembly.

Figure 6 is a top plan of the dowel device assembly, and Figures 7 and 8 and 9 are side and front views thereof.

Figure 10 is a detail of the locking bolt.

Figure 11 is a detail view of a dowel pin, per se.

Within the camera box 2 and on the lens wall thereof is a track make-up comprising the usual aperture plate 3 and affixed guide plate 4 (Fig. 3). Commonly a spring clamped presser plate 5 is snugly mounted in the guide plate 4 and when a film F, or films in a pack, are threaded into the track make-up the film must be forcibly dragged past the set presser plate 5. The aim of this invention is to greatly accelerate the threading of a film or films into the track make-up for proper intermittent engagement by a pilot pin unit 7 and the usual feeding claw 8, both of well known structure and operation.

In the instant invention the presser plate 5 is so loosely fitted in the guide plate that unless it is locked in closed position it can freely float or tip outwardly to a degree to let the lead end of a film be readily threaded down to the withdrawn pilot pins and the claw.

When a film is being threaded into the track make-up that portion of the film which is in opposition to the pilot pins is so much concealed that much time is lost to longitudinally shift the film, manually, into exact register with the near ends of the pilot pins for their safe entry—to hold the film for lens exposure.

This invention embodies a visual means to engage a visible portion of the film—a portion exposed for access above the upper end of the aperture and guide plates. This means includes a pair of dowel pins 10—10 spaced to enter a cross-pair of film perforations P, Fig. 7, and which are rigidly fixed in a cross-head 11 which is manually shiftable between bearings 12 and 13 in which the dowel pins reciprocate. A spring 14 normally thrusts the cross-head away from the film engaging position, Fig. 1. The cross-head 11 has a finger rest 11r by which the cameraman lightly presses the pins 10 toward a presented and clearly seen portion of the film (or films) F and at the same time fingers the film to register a pair of its perforations with and then press the film onto the juxtaposed dowel pins 10.

The pins 10 are so vertically spaced above the pilot pins 7 that when a film has been pre-positioned by the dowel pins 10 (entered by said pins 10), when manually thrust to the left hand, there will be a pair of film perforations exactly opposite the pilot pins 7 and these can then slide into the film perforations in a safe and reliable manner even though their conjuncture is not visible—wherein lies the trouble in the common threading technique. As soon as the dowel pin unit has served its pre-positioning function it is released by the cameraman and the spring 14 thrusts the dowel unit to the right thus clearing the film for mechanical feeding action of the claw.

The presser plate 5 is constantly under light tipping pressure of a spring 5s and is normally locked in closed position, Fig. 5, by a bolt 15 slidably mounted in an assembly block 16 (which includes bearings 12—13) and has on one end a threaded button 17 to engage the plate 5 and which is backed by a lock-nut 18. This bolt has a cross-key 19 engaging in the side arms of a fork 20 forming a part of a crank-lever 21 having a pintle 22 supported in the block 16. As seen in Fig. 9 this crank has a rearwardly extending limb 21x with a lateral horn 21h. It is a feature of this invention that the bolt 15 is set to lock the presser plate 5 by means of the usual lever 25 which operates to withdraw the usual pilot pin unit 7 from effective position when it is desired to thread in a new film. Figs. 4 and 8 show the lever 25 in normal position when the pilot pins are normally functioning—to engage in the film. Fig. 1 shows the control lever 25 shifted to the right to withdraw the pilot pins for film threading and freeing the crank horn 21h so that the bolt 15 is free and unlocks the presser plate 5.

As soon as the film has been pre-positioned by the dowel pin device 10 the control lever 25 is thrown to the left, from Fig. 1, position and the reciprocative pilot pin unit is again in position for normal operation along with the claw 8. The bolt 15 is now set to the left by the lever 25 to lock the presser plate and overcomes the light spring 5s.

The assembly block 16 is bodily applied to or removed from the camera box and in any suitable manner affixed, as to the back wall W thereof, Fig. 7.

It is preferred that the old spring clamp (not shown) used to hold the presser plate 5 be discarded so that the bolt herein disclosed may be employed—with its stated advantages.

When threading bi-pack films F—F' into the camera it may be necessary to use fingers of both hands. Therefore, a brake spring 26 is provided to engage the cross-head 11, or other suitable part of the dowel device, and hold the dowels against the retracting effort of the spring 14 while the plural films are being dowelled.

The crank-lever 21 has a top prong 21p adapted to swing to the right against an interposed stud 11s on the bottom of the cross-head 11 when the control lever 25 is pushed to the left, Fig. 8, to return the plunger to the locking position against the presser plate 5. This action overcomes the brake spring 26 and allows the retracting spring 14 to retract the dowels. The lever 25 has a spring latch 26x taking into a keeper hole 25h in the back wall W whereby to rigidly lock the plunger in effective position against the plate 5.

*Plural film exposure*

The positive locking of the presser plate is of importance and great advantage in the concurrent exposure of two or more films in the guide track at the aperture plate of the camera. Conventional cameras do not have a means which will effectively compactly hold superposed films at the aperture plate in such a manner that identically registered images will be made at the focal plane for the reason that the two films can relatively fluctuate—that is can "weave" or have a "breathing" (to and fro) motion as to the focal plane.

When a colored positive is to be made from two color-correctioned, common image negatives it has been found necessary to waste thousands of feet of film and cause many reprints in the laboratory before a satisfactory positive can be made from poor negatives which are the product of insecure presser plate operation.

This invention solves the "off-setting" problem in making negative spliced films by the provision of a presser plate lock-in device which precludes possible vibration or chatter of the presser plate while it functions to sustain the film being exposed in such secure manner that weaving and breathing actions of the films cannot occur. The images are produced in identical register immediately on the focal plane of the camera—that insures the correct register of images when later a positive is to be made.

Positive prints made from accurately registered images are free from the effect of fugitive colors, and image blurring, and color bleeding.

What is claimed is:

1. In a motion picture camera, a film presser plate and a transmission member for moving the plate to a closed position, and a pilot pin mechanism having a control lever operative to engage and actuate said member to lock stationary the plate in its effective position while the pin is in reciprocating operation.

2. The camera of claim 1; said member operative to release the plate when and while the pilot pins are held stationary out of film engaging function.

3. The camera of claim 2; the plate automatically opening from the film when released by said mechanism.

4. A motion picture camera having pilot pin means having a locking lever, and a presser plate and a pressure bolt therefor which is engaged by said lever to positively close and lock the plate while said mechanism is in operation.

5. The camera of claim 4; said plate moving from film pressing position when released by the lever.

6. An assembled unit for bodily installation and removal as to a motion picture film camera having a presser plate and a lock-handle controlled register pin mechanism; said unit including a mounting block having a bolt slidable therein for engaging and closing the plate to effective position, and a lever pivoted on the block operatively connected to the bolt to reciprocate the bolt; said lever being adapted to be engaged and operated by the lock handle of said mechanism.

7. The unit of claim 6; and a slide mounted on the said block and having a film engaging dowel device and which slide is operative by said lever concurrently with action of the bolt by said handle.

8. In a motion picture camera, a pilot pin unit, a manual lever connected with said unit to engage it with and disengage it from a film threaded in the camera, a slide mounted in the camera and having pre-positioning dowel pins in a position to enter visible perforations in an introduced film whereby to register other perforations in the film for entry by the pilot pin unit, and a crank pivoted in the camera and having a part engageable with and for shifting said dowel slide, and the crank having a part engageable with said manual lever and by which said slide is moved concurrently with said pin unit.

9. The combination of claim 8; and a presser plate and a setting bolt therefor slidably mounted in the camera and connected to said crank for concurrent action therewith by operation of said lever.

10. The combination in a motion picture camera having a presser plate and a pilot pin device and a locking lever for shifting said device to and from effective film engaging position; of means for setting the presser plate concurrently with an action of said lever and including a bolt to engage and set the plate and a rocking crank device connected to said bolt and being engaged and actuated by said lever when it shifts the said pin device to effective position.

11. The combination of claim 10; and a film threading dowel instrument manually shiftable to film engaging position and which is engageable by a part of said crank for shifting action thereby.

12. The combination of claim 11; a spring normally retracting the said instrument from the film, and a brake engaging and releasably holding the instrument in retracted position.

GLEN GANO.

REFERENCES CITED

The following references are of record in the file of this patent:

UNITED STATES PATENTS

| Number | Name | Date |
|---|---|---|
| 1,840,353 | Fear | Jan. 12, 1932 |
| 1,879,844 | Debrie | Sept. 27, 1932 |
| 1,922,742 | Mitchell | Aug. 15, 1933 |
| 1,933,783 | Wittel | Nov. 7, 1933 |
| 1,944,500 | Garde | Jan. 23, 1934 |
| 2,101,469 | Ellinwood | Dec. 7, 1937 |
| 2,218,763 | Mery | Oct. 22, 1940 |
| 2,373,243 | Grimson | Apr. 10, 1945 |
| 2,422,270 | Tondreau | June 17, 1947 |